US007630739B2

(12) United States Patent
Murakami et al.

(10) Patent No.: US 7,630,739 B2
(45) Date of Patent: Dec. 8, 2009

(54) DYNAMIC CELL RECONFIGURING METHOD AND CELLULAR NETWORK SYSTEM TO WHICH THE METHOD IS APPLIED

(75) Inventors: Norio Murakami, Kawasaki (JP); Seguel Kembo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 424 days.

(21) Appl. No.: 11/391,580

(22) Filed: Mar. 28, 2006

(65) Prior Publication Data

US 2007/0142057 A1 Jun. 21, 2007

(30) Foreign Application Priority Data

Dec. 15, 2005 (JP) ............................. 2005-361244

(51) Int. Cl.
*H04M 1/00* (2006.01)
(52) U.S. Cl. ................. 455/562.1; 455/101; 455/452.2; 343/702
(58) Field of Classification Search ...... 455/561–562.1, 455/450–452.2, 447, 101; 342/354; 343/700 MS, 343/702
See application file for complete search history.

(56) References Cited

U.S. PATENT DOCUMENTS

| | | | | |
|---|---|---|---|---|
| 4,144,496 A | * | 3/1979 | Cunningham et al. | 455/447 |
| 4,352,110 A | * | 9/1982 | Braak | 343/844 |
| 4,485,486 A | * | 11/1984 | Webb et al. | 455/450 |
| 4,696,027 A | * | 9/1987 | Bonta | 455/436 |
| 5,175,878 A | * | 12/1992 | Davis et al. | 455/103 |
| 5,185,739 A | * | 2/1993 | Spear | 370/337 |
| 5,193,109 A | * | 3/1993 | Chien-Yeh Lee | 455/436 |
| 5,212,830 A | * | 5/1993 | Miller | 455/447 |
| 5,365,571 A | * | 11/1994 | Rha et al. | 455/446 |
| 5,432,780 A | * | 7/1995 | Smith et al. | 370/297 |
| 5,475,864 A | * | 12/1995 | Hamabe | 455/452.2 |
| 5,491,833 A | * | 2/1996 | Hamabe | 455/422.1 |
| 5,535,423 A | * | 7/1996 | Dupuy | 455/449 |
| 5,548,813 A | * | 8/1996 | Charas et al. | 455/562.1 |
| 5,559,866 A | * | 9/1996 | O'Neill | 455/447 |
| 5,565,873 A | * | 10/1996 | Dean | 342/372 |

(Continued)

FOREIGN PATENT DOCUMENTS

EP 0 987 838 3/2000

(Continued)

OTHER PUBLICATIONS

European Search Report dated Jan. 26, 2009, from the corresponding European Application.

(Continued)

*Primary Examiner*—Sharad Rampuria
(74) *Attorney, Agent, or Firm*—Katten Muchin Rosenman LLP

(57) ABSTRACT

A cell configuration can be easily and dynamically changed with less equipment correspondingly to a communication environment by a dynamic cell reconfiguring method in a cellular network system including an antenna that has a plurality of sector antennas disposed correspondingly to a cell and a plurality of base station equipment disposed at a location distant from the antenna. Based on a predetermined parameter value output from the plurality of the sector antennas, a configuration of the cell is changed by switching connection between the plurality of the base station equipment and the plurality of the sector antennas.

7 Claims, 14 Drawing Sheets

U.S. PATENT DOCUMENTS

| | | | | |
|---|---|---|---|---|
| 5,596,329 | A | * | 1/1997 | Searle et al. ............... 342/374 |
| 5,621,752 | A | * | 4/1997 | Antonio et al. ............ 375/144 |
| 5,649,287 | A | * | 7/1997 | Forssen et al. ............ 370/312 |
| 5,666,123 | A | * | 9/1997 | Chrystie .................... 342/373 |
| 5,684,491 | A | * | 11/1997 | Newman et al. ............ 342/374 |
| 5,991,630 | A | * | 11/1999 | Charas ................... 455/452.1 |
| 6,038,459 | A | | 3/2000 | Searle et al. |
| 6,104,930 | A | * | 8/2000 | Ward et al. .................. 455/450 |
| 6,201,801 | B1 | * | 3/2001 | Dent .......................... 370/342 |
| 6,381,462 | B1 | * | 4/2002 | Charas ................... 455/452.2 |
| 6,463,303 | B1 | * | 10/2002 | Zhao ...................... 455/562.1 |
| 6,898,431 | B1 | * | 5/2005 | Peele ......................... 455/453 |
| 6,996,418 | B2 | * | 2/2006 | Teo et al. ................ 455/562.1 |
| 7,039,441 | B1 | * | 5/2006 | Reudink et al. ......... 455/562.1 |
| 7,062,246 | B2 | * | 6/2006 | Owen ...................... 455/277.1 |
| 7,379,741 | B2 | * | 5/2008 | Ahn et al. ................... 455/450 |
| 2003/0162566 | A1 | * | 8/2003 | Shapira et al. ............. 455/561 |
| 2007/0135053 | A1 | * | 6/2007 | Haartsen ................... 455/63.4 |

FOREIGN PATENT DOCUMENTS

| | | |
|---|---|---|
| JP | 6-153256 | 5/1994 |
| JP | 2001-128227 | 5/2001 |
| WO | 96/17487 | 6/1996 |
| WO | 96/38011 | 11/1996 |

OTHER PUBLICATIONS

Ryutaro Ohmoto, et al. "Fiber-Optic Microcell Radio Systems with a Spectrum Delivery Scheme" IEEE Journal on Selected Areas in Communications, vol. 11, No. 7, Sep. 1993, pp. 1108-1110.

* cited by examiner

Omnidirectional

2 Sectors

3 Sectors

6 Sectors

2 Sectors

3 Sectors

6 Sectors 2-4 Sectors 1-2-3 Sectors 1-1-4 Sectors

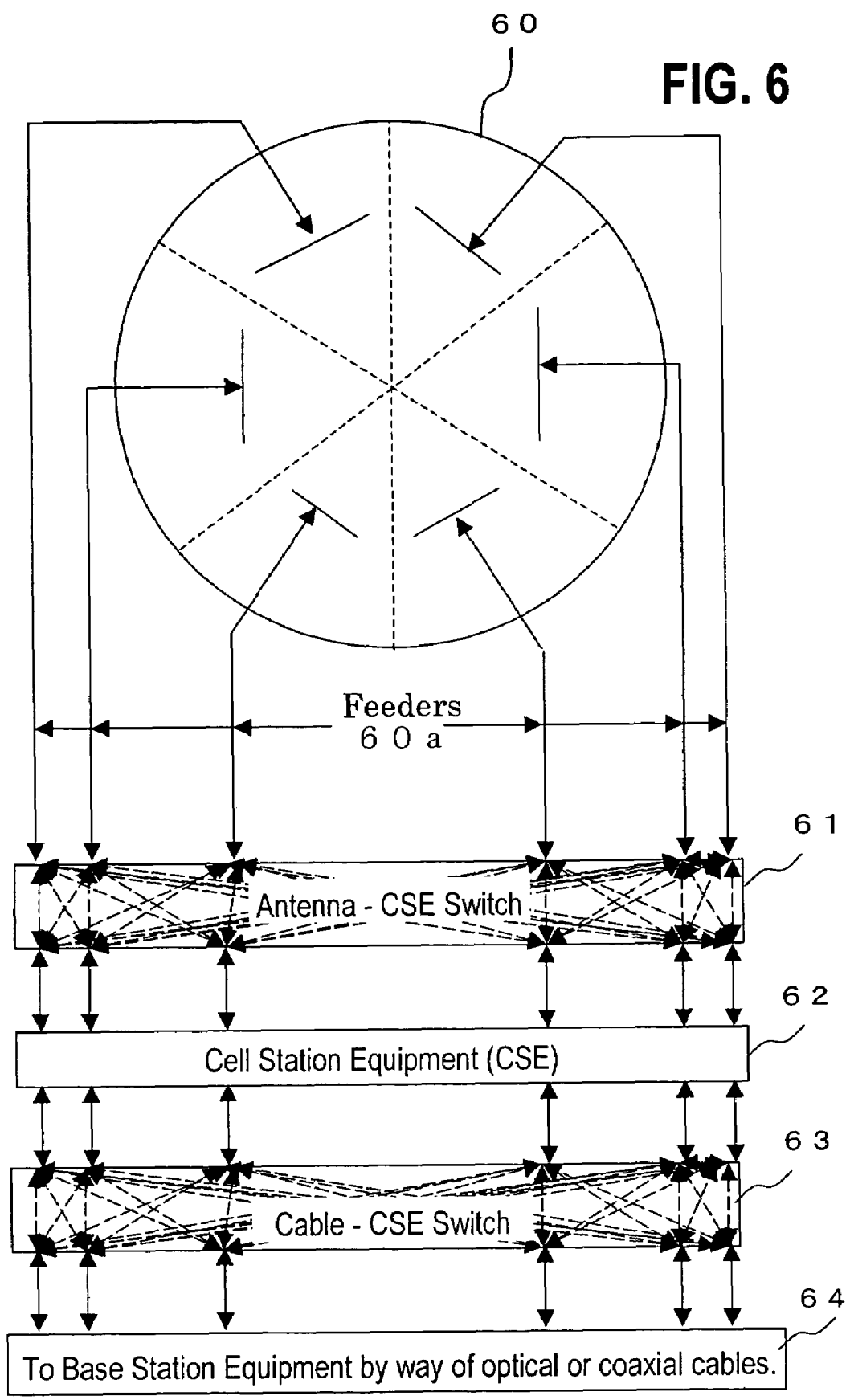

DYNAMIC CELL RECONFIGURING METHOD AND CELLULAR NETWORK SYSTEM TO WHICH THE METHOD IS APPLIED

CROSS-REFERENCE TO RELATED APPLICATIONS

This application is based upon and claims the benefit of priority from the prior Japanese Patent Application No. 2005-361244, filed on Dec. 15, 2005, the entire contents of which are incorporated herein by reference.

BACKGROUND OF THE INVENTION

1. Field of the Invention

The present invention relates to a dynamic cell reconfiguring method and a cellular network system to which the method is applied. More particularly, the present invention relates to a method of dynamically switching sector antennas to reconfigure cells adaptively to a traffic situation, and a cellular network system to which the same is applied.

2. Description of the Related Art

FIG. 1 shows a cell configuration in a cellular network system used widely throughout the world in general.

In FIG. 1, each circle represents a service area of a cell. A divided part of each circle shows a range covered by each sector antenna in the cell. The range covered by the sector antenna constitutes of a small independent area called a sector.

The sector is not affected by other network portions. In an example of FIG. 1, one cell is divided into six sectors, and each sector is independent of other sectors. The number of the sectors is not limited to six, and the cell is often divided into three sectors.

Because of the characteristic and applicability of the sector antenna, the cell can be divided into a large number of sectors, such as nine or twelve sectors.

In FIG. 1, a conventional cell configuration is the same in a business zone and a residence zone. All the cells include wireless devices and these wireless devices are installed in buildings or movable shelters.

As shown in FIG. 2 describing changes in a traffic amount over time, peak usage is at different moments depending on situations. A business zone I and a residence zone II have opposite tendencies at same hours during the day.

In the business zone I, the usage is high at daytime business time zone III and the usage is low in the nighttime. Contrary, in the residence zone II, the usage is low at daytime zone III and the usage is high in the nighttime.

When a network system is constructed, a peak time zone is found out when network is most busy and a traffic amount at that time zone is determined to decide the number of installed base stations. This means that network apparatuses are provided to maintain the quality of the service such that no call is lost or discontinued in the busiest time zone.

People work in the daytime and go home in the nighttime. The business zone is almost empty in the nighttime. Therefore, the network in the residence zone has an excessive capacity in the daytime and the network in the business zone has an excessive capacity in the nighttime. These excessive capacities increase costs of the network.

In such a network configuration, typically, it is acceptable a quality of the service to the extent that in 100 calls in a mobile network or one or two calls are lost in handover operation or at initial connection. The handover corresponds to path connection of a communication link from one cell to another cell.

However, since the cellular network looking at this operation property based on human migration, the cellular network includes the possibility of reducing total costs.

Prior art eliminating unbalance in communication capacities depending on time zones includes an invention described in Japanese Patent Application Laid-Open Publication No. 2001-128227. The invention described in Japanese Patent Application Laid-Open Publication No. 2001-128227 is a mode of controlling an electric wave radiation directivity, etc. of a base station depending on a base station state pattern table maintained and managed in a switching equipment based on the premise of maintaining and managing the base station state pattern in the switching equipment and the premise of that the base station can change the electric wave radiation directivity, transmission power, and receiver sensitivity, and the domain of applicability is array antenna control.

Another technology is an invention described in Japanese Patent Application Laid-Open Publication No. 1994-153256. The purpose of the invention described in Japanese Patent Application Laid-Open Publication No. 1994-153256 is to change the number of carriers used in a cell depending on traffic of each cell. This mode is provided with an optical switch and changes a connected cell with an optical cable. The cell configuration itself is "fixed". That is, only the number of carriers assigned to a cell is changed depending on traffic.

In the technologies eliminating unbalance of communication capacities depending on time zones shown in FIG. 2, the domain of applicability of the invention described in Japanese Patent Application Laid-Open Publication No. 2001-128227 is limited to array antenna control, and the amount of equipment such as installed base stations is not expected to be reduced in the invention described in Japanese Patent Application Laid-Open Publication No. 1994-153256.

Although traffic amounts of the day and night are actually varied in each region and the difference between the daytime and the nighttime is especially significant in a business block and a residential block, in a conventional method, equipment such as base stations has been installed such that the maximum traffic of the region can be supported. Therefore, wasted capital investments must be provided and this is a problem in the aspect of effective utilization of equipment.

SUMMARY OF THE INVENTION

The object of the present invention is therefore to provide a dynamic cell reconfiguring method that achieves a fundamental solution for reducing the amount of equipment and a cellular network system to which the same is applied and to reduce the amount of equipment constituting wireless access network such as base stations to enable economization.

In order to achieve the above object, according to a first aspect of the present invention there is provided a dynamic cell reconfiguring method in a cellular network system including an antenna that has a plurality of sector antennas disposed correspondingly to a cell and a plurality of base station equipment disposed at a location distant from the antenna, wherein based on a predetermined parameter value output from the plurality of the sector antennas, a configuration of the cell is changed by switching connection between the plurality of the base station equipment and the plurality of the sector antennas.

In order to achieve the above object, according to a second aspect of the present invention there is provided a cellular network system including an antenna that has a plurality of sector antennas disposed correspondingly to a cell and a plurality of base station equipment disposed at a location distant from the antenna linked through a transmission medium, comprising a plurality of cell station equipment that has interfaces and amplifiers corresponding to the transmission medium on the antenna side; a first switch that switches and connects the plurality of the cell station equipment to the plurality of the sector antennas of the antenna; and a control circuit that controls the first switch by detecting a predetermined parameter in the plurality of the sector antennas of the antenna such that the connection between the plurality of the cell station equipment and the plurality of the sector antennas is reconfigured based on the detected parameter. The predetermined parameter may be a quality of service (QoS) value. The antenna may have six sector antennas, and when the six sector antennas are connected to the same cell station equipment in parallel, the six sector antennas have almost an omni-directional antenna radiation pattern characteristics. The transmission medium may be a plurality of coaxial cables or optical fibers linking the plurality of the base station equipment and the plurality of the cell station equipment, and the cellular network system may further comprise a second switch that switches and connects the combination of the plurality of the coaxial cables or optical fibers and the plurality of the cell station equipment on the antenna side; and a third switch that switches and connects the combination of the plurality of the coaxial cables or optical fibers and the plurality of the base station equipment on the base station equipment side, and the control circuit may further control the second and third switches based on the detected parameter to reconfigure the combination of the connection between the plurality of the base station equipment and the plurality of the cell station equipment. The cell station equipment may include a circuit that adjusts impedance changes depending on which of the plurality of the sector antenna is connected. According to the present invention, an efficient communication service can be maintained with less equipment in a system where equipment such as base station equipment are provided in consideration of the worst value of parameter, such as QoS at traffic peak hour.

The features of the present invention will become more apparent from embodiments described later with reference to the drawings.

BRIEF DESCRIPTION OF THE DRAWINGS

FIG. 6 is a functional diagram in one cell site;

DESCRIPTION OF THE PREFERRED EMBODIMENTS

Embodiments of the present invention will be described with reference to the drawings. The embodiments are for the purpose of understanding the present invention and the application of the present invention is not limited by these embodiments. The technical scope of the present invention includes those described in the claims and equivalents thereof.

Figure 1:
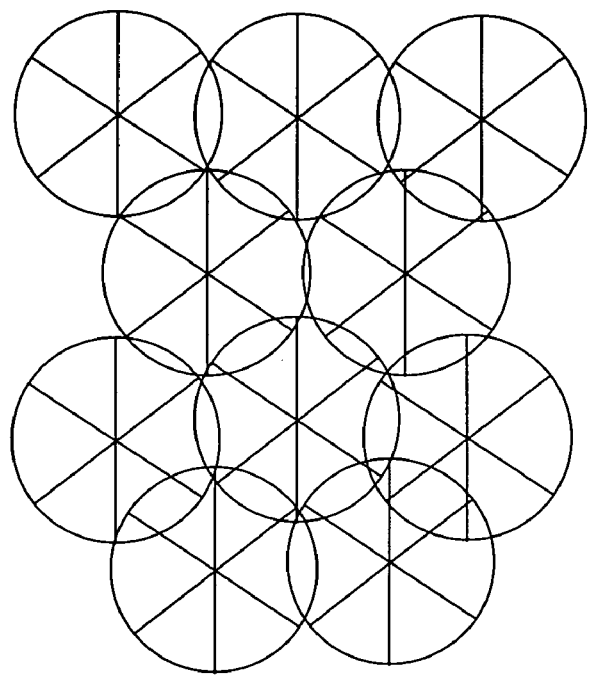
FIG. 1 shows a cell configuration in a cellular network system used widely throughout the world in general.
Figure 2:
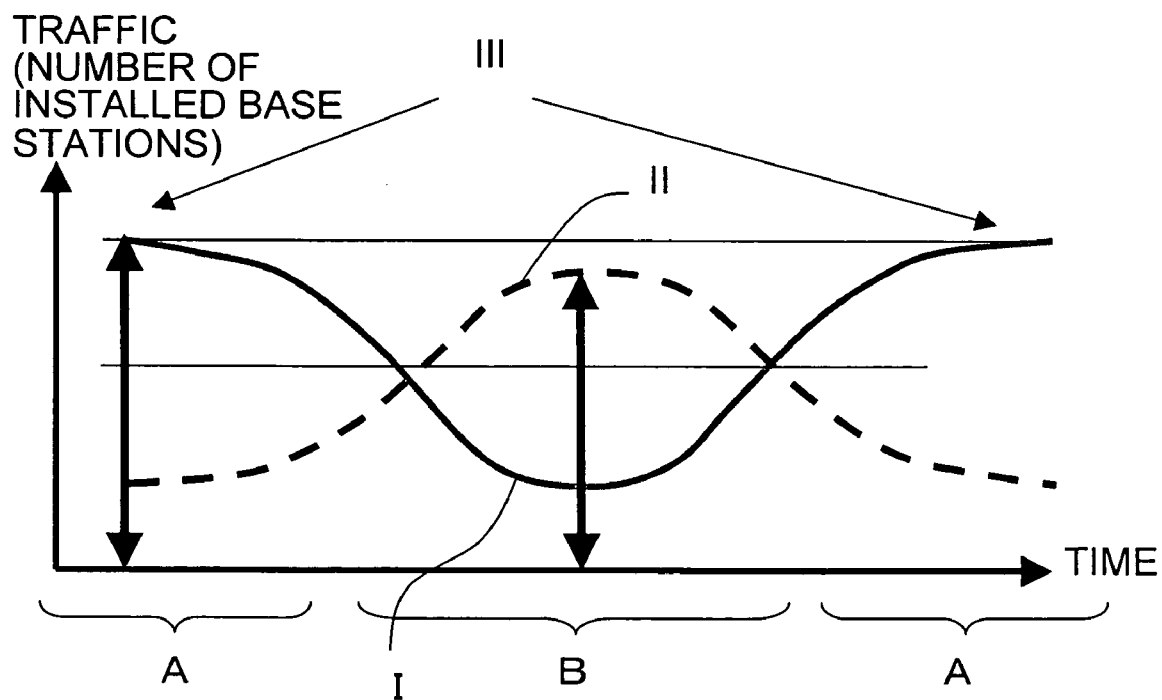
FIG. 2 is a diagram for describing changes in a traffic amount over time.
Figure 3:
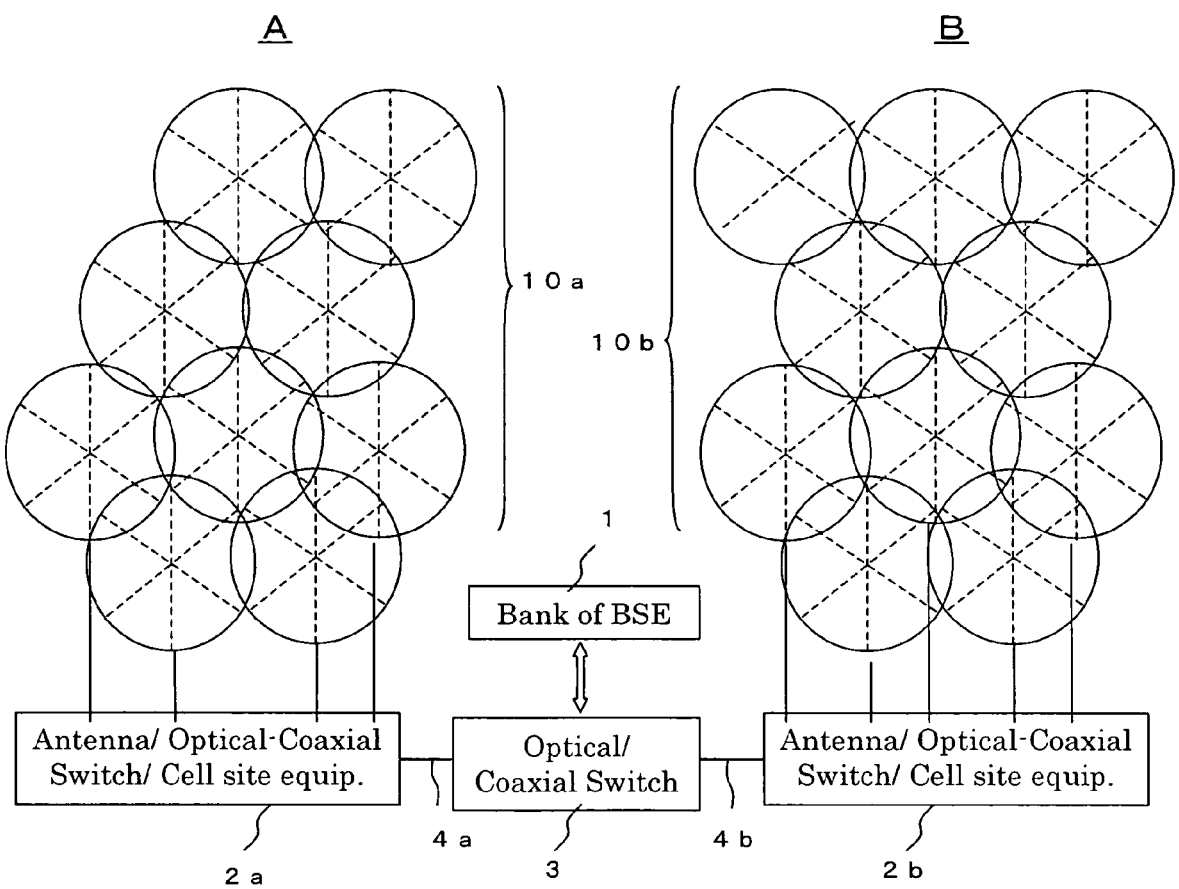
FIG. 3 shows an overall configuration of a cellular network system to which the present invention is applied.

FIG. 3 shows an overall configuration of a cellular network system to which the present invention is applied. A principal control apparatus realizing a characteristic novel function of the present invention is disposed in a center area as much as possible.

In FIG. 3, A is cellular network in a business zone and B is cellular network in a residence zone.

The principal control apparatus realizing a characteristic novel function of the present invention is disposed in a center area. That is, a group of base station equipment 1 is disposed in the center area. Hereinafter, the group of the base station equipment is referred to as a bank. Corresponding sensor of control equipment are disposed in individual equipment 2a, 2b attached to an antenna of the business zone A and an antenna of the residence zone B to control the novel function according to the present invention.

In the present invention, the most expensive shared portion for cell groups 10a, 10b in each zone of the network is the base station equipment 1, which is located at the center, they are allocated and connected by way of controller by operating the switch 3 and an algorithm for dynamically connecting the base station equipment 1 to a relevant cell. Signals are delivered to the cell groups 10a, 10b through optical fibers or coaxial line paths 4a, 4b.

In FIG. 3, the bank of the base station equipment 1 is located in a center portion and is allocated for the cell groups 10a, 10b depending on needs when the traffic in the relevant area is increased.

At the same time, the connection between each antenna of the cell groups 10a, 10b and the bank of the base station equipment 1 is reconfigured to have a different traffic capacity in a sector of each cell to cover the whole area.

Contrary, if traffic is reduced in one cell, the base station equipment 1 is detached and returned to the bank to wait for a new assignment bank. Of course, the antennas are reconfigured such that whole area is covered with a necessary traffic amount capacity.

In the embodiment, the cell is automatically set to be omni-directional and to have up to six sectors by way of the example. That is, since a narrower sector antenna can be applied and will be applied in the future, the present invention can be utilized with the use of an antenna for a cell with nine or twelve sectors without modification.

Description will hereinafter be made of an algorithm with a basic symmetric property based on the overall configuration of the present invention.

[Network Component]

Main components of the adaptive network according to the invention are as follows.

i. Reconfigurable Antenna

In FIG. 3, respective antennas constituting the cell groups 10a, 10b can be of the following reconfigurable types.

The number of sectors can be varied in each antenna. A sector angle can be varied. The antenna beam pattern can be manipulated. This last type of the antenna is an array antenna and is effective to be used in a low traffic amount.

ii. Base Station Equipment

In FIG. 3, the base station equipment 1 are arranged in a group (bank) and are preferably provided at considered positions where the total distance to the position of each antenna in the cell groups 10a, 10b is reduced.

This type of the equipment can be connected in the following two ways. The installation location of the base station equipment 1 is not limited.

The antenna and the base station equipment are linked (connected) through a coaxial cable. Alternatively, the antenna and the base station equipment are linked through an optical fiber.

iii. Switch

Base station equipment (BSE) switch: this is a switch 3 of the bank of the base station equipment. The switch 3 is used for selecting one of a plurality of the base station equipment in the center portion. Since the optical fibers or coaxial cables 4a, 4b are used as transmission media for connecting with the cell groups 10a, 10b, the switch 3 must have a function for switching the fibers or coaxial cables 4a, 4b.

Transmission medium switch of the cell (included in the individual apparatuses 2a, 2b): this switch is a switch corresponding with the switch 3 of the base station equipment. This switch connects one of the transmission media (optical or coaxial) to the corresponding base station equipment. If the cable or the base station equipment is defective, this switch is controlled to connect a predetermined spare equipment.

Antenna switch: this is a switch of the cell group 10a, 10b and is disposed to select one or a plurality of panel antennas that are antenna elements of the cell.

iv. Reconfigurable Antenna

This is each of antennas constituting the cell groups 10a, 10b. This antenna is unidirectional for transmission or reception function just like any antenna typically used in a wireless system. Since transmission direction and reception direction characteristics have the same propagation characteristic, description will be made of only one direction.

An omnidirectional antenna is an antenna without any preference specificity in the electric wave radiation pattern direction. In practical equipment such as cell equipment, the omnidirectional antenna typically performs radiation in a plane vertical to the antenna without certain directionality.

Therefore, when the directional characteristic pattern of the omnidirectional antenna is viewed from above the antenna, the observed pattern is an almost circle radiation pattern, that is, a pattern with the same antenna gain in each direction.

In fact, this approximately circle directional characteristic is not a complete circle. This is because when gain or loss is measured at a certain angle dependently on the installation of the antenna, the gain or loss has a difference of several dB relative to other angles. However, the antenna is referred to as an omnidirectional antenna.

In the cellular network, the omnidirectional antenna is intended to be used mainly in a situation of rural regions, that is, when a traffic amount is small.

In other regions with a large traffic amount, a 360-degree plane is divided to use a plurality of antennas, and the radiation pattern of the antenna is directed to a certain direction. For example, the 360-degree plane is divided and covered by using two, three, or six directional antennas.

Figure 4A:
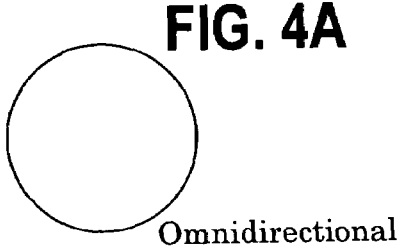
FIGS. 4A to 4D show radiation pattern examples of sector antennas.
Figure 4B:
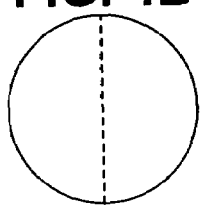
Figure 4C:
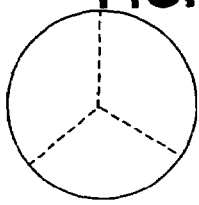
Figure 4D:
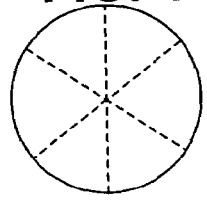

This partial directional antenna is referred to as a sector antenna. FIGS. 4A to 4D show radiation pattern examples of the antennas. FIG. 4A is an example of the omnidirectional antenna, and FIGS. 4B, 4C, and 4D are examples of a two-sector antenna, three-sector antenna, and six-sector antenna, respectively.

In fact, an antenna for more than six sectors can be deduced by the same logic. In a brochure of a sector antenna manufacturer, some antennas can be used in nine sector cells. Furthermore, if a narrow radiation pattern antenna can be designed, more sectors can be considered.

In the cellular network system, different signals are separately connected, transmitted, and received in each sector. In this way, each sector is completely independent from other sectors. Therefore, depending on technologies used, the same frequency can be used in the same cell area.

In the present invention proposed in this application, a sector antenna is required to be used. Therefore, since the same signal is radiated from each sector antenna by supplying the same signals in common instead of supplying a different signal to each of the sector antennas, the antenna directivity approximate to the omnidirectional antenna can be obtained in the radiation pattern. In fact, the antenna directivity is not strictly circular as compared to one omnidirectional antenna, it can be said that the antenna directivity is omnidirectional for any practical purposes.

Such a configuration is intended to be used mainly in a city environment, that is, in large cities with a multiplicity of towering buildings. In such an environment, a multiplicity of multi-path transmissions is generated so as to reduce the directionality characteristic which the omnidirectional antenna implemented in this way can possess.

The same applies to the opposite direction, i.e., in the case of reception.

Typically, in the case of 3G devises, each sector antenna of the cell groups 10a, 10b is connected to one transceiver in the base station equipment (BSE) called Node B.

In the present invention, typically, the same connection is performed for site sector antennas in a cell site. That is, if six sector antennas are connected in parallel, due to an appropriate impedance matching apparatus, the antennas are considered as only one antenna when observed from outside and have approximately omnidirectional antenna directivity.

A group of six sector antennas can be connected to single base station equipment and can be operated indistinguishably from the omnidirectional antenna.

If one sector antenna is detached from six sector antennas and is connected to another transceiver in different base station equipment, this sector antenna is completely independent from other five sector antennas working together.

Any sector antenna can be detached from the remaining five sector antennas and can be connected to different or same base station equipment in accordance with traffic and/or control algorithm used.

Contrary, by connecting again the detached sector antenna at the others, the original omnidirectional antenna can be restored.

Consecutive (adjacent) three sector antennas can be detached at the same time to form two sector antennas. In a similar manner, consecutive two sectors can be detached at the same time, and by leaving other four sector antennas, asymmetrical four and two sector antennas can be obtained.

Alternatively, by detaching inconsecutive two sector antennas to leave other four sector antennas, another mode of asymmetrical four and two sector antennas can be obtained.

FIGS. 5A to 5F show several antenna types obtained by switching sector antennas of a cell site.

The combination of the sector antenna is not fixed and can be dynamically changed by a control algorithm. If traffic increases to a threshold value or more in an area covered by sector antennas, when the mechanism is used for detaching one or more sectors of the antennas according to the present invention, very flexible transmission network can be obtained using minimum equipment in the cell site and the number of the base station equipment used can be reduced to save a large part of the capital expense.

Figure 5A:
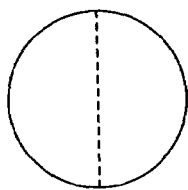
FIGS. 5A to 5F show several antenna types obtained by switching the sector antennas in a cell site; 5A to 5C are symmetrical configurations, 5D to 5F are asymmetrical ones.
Figure 5B:
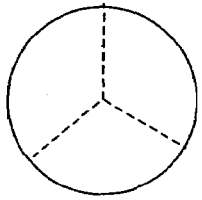
Figure 5C:
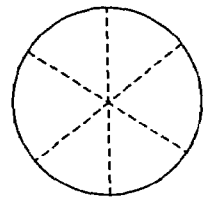
Figure 5D:
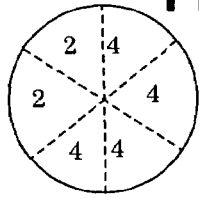
Figure 5E:
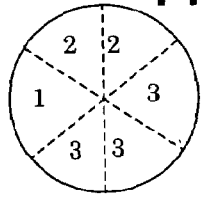
Figure 5F:
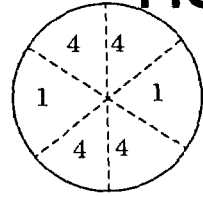

FIGS. 5A, 5B, and 5C are normal sector antennas. FIGS. 5D, 5E, and 5F show the sector detachment according to this invention. In the antennas of FIG. 5D, two sector antennas are linked and four sector antennas are also linked. This is an example of asymmetrical six sector antenna configuration with two and four sector antenna linked. This is referred to as a 6-2-4 sector. A first numeral is the number of the sector antennas in the antennas. Next two numerals indicate the numbers of linked sector antennas.

Similarly, the antenna shown in FIG. 5E shows a configuration with one independent sector antenna, two linked sector antennas, and other three linked sector antennas. This is referred to as a 6-1-2-3 sector.

In the antennas shown in FIG. 5F, two single sector antennas are put in an independent state and other four sector antennas are linked together. This antenna is referred to as a 6-1-1-4 sector.

Description will be made of how reconfiguration of antennas is performed to comply with the traffic requirement. Switching is performed for this antenna reconfiguration in accordance with an algorithm.

In the case of low traffic, each sector antenna is supplied with the same signal corresponding to one sector. Of course, the antenna has a matching circuit for performing correct impedance matching. This impedance matching circuit is simple and does not constitute a portion of the present invention. All six sectors radiate the same signal. Also all the signals received by the sector antennas (opposite direction) are coupled before sent to a receiver.

When the traffic increases, one sector is detached from other five sectors. This makes the asymmetrical antennas.

In accordance with the algorithm of the present invention, the sector antennas are reconfigured to deal with the traffic depending on the zone with increased or decreased traffic. Therefore, the detached sector antenna is a sector where most traffic is carried.

If the traffic continues to increase, the traffic processed by five antennas exceeds the capacity limit again and another sector antenna is detached. The traffic is handled by four connected cell antennas and two single sector antennas.

The algorithm proposed in the present invention checks whether or not each sector processes the traffic at a level of a threshold or less to determine if the necessary resource or more is used. In such a case, the detached sector antenna is no longer used and is coupled to another detached sector antenna or is combined to the sector antenna that can process the traffic, and necessary reconfiguration with the base station equipment is controlled.

Next, description will be made of the process when the traffic decreases.

When the traffic is near the system design limit and very high, each sector antenna is therefore connected directly to different base station equipment. It is assumed that the traffic decreases after certain time has passed. If total traffic in one sector is equal to or less than a threshold that is determined as a minimum, this means that the base station equipment of the sector returns to a BSE pool. It is determined which sector antenna is merged and the switch is changed over. Typically, the traffic in other sectors is also reduced to some extent. Therefore, almost all the sectors approach the threshold. If the sector antenna is merged with adjacent sector antenna, overload is not generated in the base station equipment of the merged sector. However, if overload is detected, the sector antenna can always be restored to the original state.

FIG. 6 is a functional diagram in one cell site showing an apparatus connected to the switch.

[Antenna/Cell Station Equipment Switch]

An antenna 60 has six sector antennas. Each sector antenna of the antenna 60 is connected with a feeder 60a to a cell station equipment (CSE) 62 via an antenna-CSE switch 61.

The cell station equipment (CSE) 62 is connected to a transmission medium that is an optical fiber or coaxial cable linking between the bank of the base station equipment 1 and the cell site via a cable-CSE switch 63.

One of a plurality of strings of the cell station equipment 62 is required for each of the six sector antennas of the antenna 60. In this regard, the antenna-CSE switch 61 has the following functions.

In the case of high load, the antenna-CSE switch 61 connects one sector antenna to one string of the cell station equipment 62. When the load decreases, the antenna-CSE switch 61 connects fewer strings of the cell station equipment 62 to the antenna 60.

When the traffic is very low, one CSE string of the cell station equipment 62 is connected to six cell stations in parallel.

The antenna-CSE switch 61 has an impedance matching circuit for maintaining correct matching when a plurality of different sector antennas is connected to an output power amplifier not shown in FIG. 6.

Description will be made of a configuration of the base station equipment located in a place distant from the cell site.

[Base Station Equipment Located in Distant Place]

Although the antenna 60 and the cell station equipment 62 are located at an actual cell site in the present invention as shown in FIG. 6, the base station equipment 1 is an electronic transmission/reception equipment that is the most expensive portion of the total cell site costs and is disposed in a location distant from the cell site. The distance is several hundred meters to several dozen kilometers.

The base station equipment 1 of the normal cell used in network is characterized by including a component subsystem located considerably far from the cell site.

The following two types can be classified in configurations for linking the cell site and the base station equipment 1.

Figure 7:
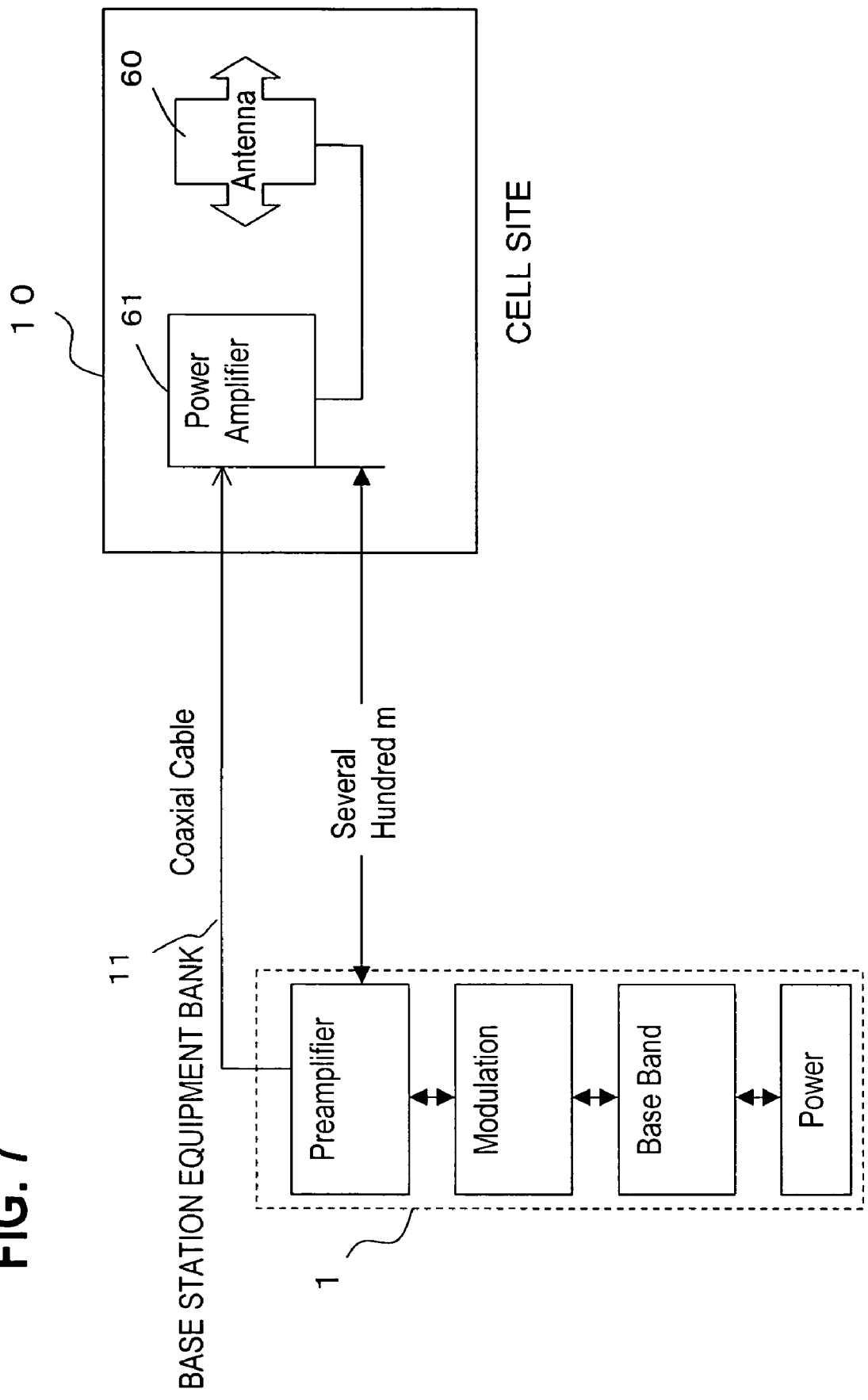
FIG. 7 shows a configuration example linking the cell site and a bank of base station equipment 1 through coaxial cables.
Figure 8:
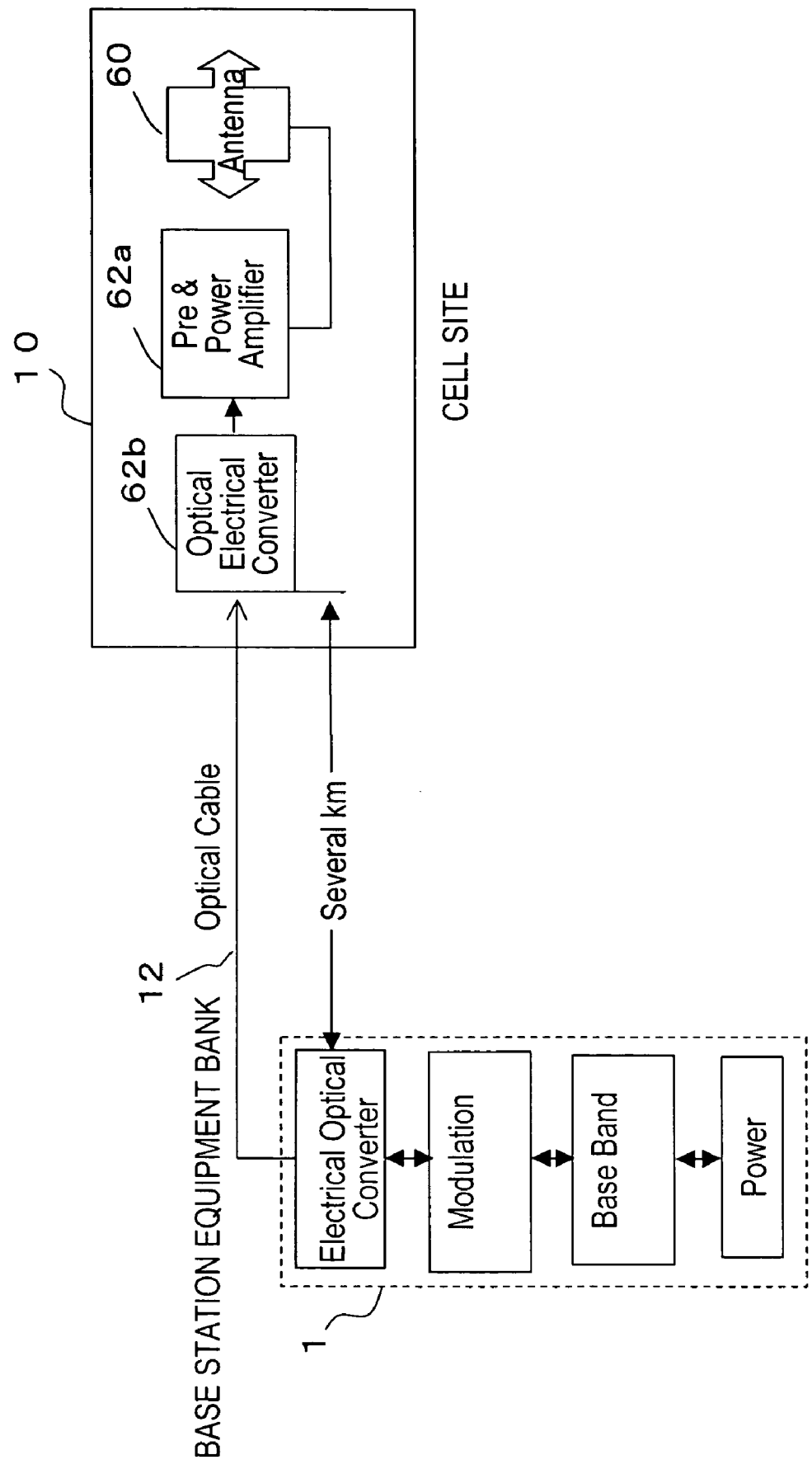
FIG. 8 shows a configuration example linking the cell site and the bank of the base station equipment 1 through optical fibers.

These types are shown in FIGS. 7 and 8. A primary difference is whether a coaxial cable 11 (FIG. 7) or an optical fiber transmission path (FIG. 8) is used as a transmission medium linking the cell site 10 and the base station equipment 1.

In FIG. 7, when the coaxial cable 11 is used to link each of the base station equipment 1 constituting the bank to the antenna 60 of the cell site 10 through a power amplifier 61, the separation distance is on the order of several hundred meters because of large loss.

On the other hand, in FIG. 8, when the optical fiber 12 is used to link each of the base station equipment 1 constituting the bank to the antenna 60 of the cell site 10 through an optical electrical conversion circuit 62b and pre-power amplifier 62a, the bank of the base station equipment 1 can be installed further from the cell site 10.

In FIGS. 7 and 8, each of the base station equipment 1 constituting the bank has the following features.

i. The coaxial cable 11 or the optical fiber cable 12 can be used as a transmission medium for linking the base station equipment 1 and the antenna 60 of the cell site 10.

Correspondingly, in FIG. 7, when the coaxial cable 11 is used, the base station equipment 1 amplifies the signal obtained by modulating a base band signal in a predetermined modulation mode with a pre-amplifier and transmits the signal to the cell site 10 through the coaxial cable 11 directly in the form of an electric signal. Correspondingly, the cell site 10 includes a power amplifier 62a that amplifies the received electric signal.

In FIG. 8, when the optical fiber cable 12 is the transmission medium, a signal modulated in a predetermined modulation mode is converted to an optical signal to transmit through the optical fiber cable 12. Correspondingly, the cell site 10 includes an optical electrical converter 62.

ii. The reconfiguration of the base station equipment 1 in the bank can be established by software. The base station equipment 1 is individually and hourly changed dependent on quality of service such as traffic situations in the cell site 10 disposed in the network.

iii. The reconfiguration of the base station equipment 1 is to be adapted such that the base station equipment 1 acts as a base station in any portion of the network.

iv. Several parameters can be changed, for example, a frequency used, adjacent list, window size (communicatable distance), etc.

v. The base station equipment 1 are desired to be installed collectively at a strategic point in the network.

vi. The collectively installed base station equipment can be operated as the base station equipment operated in a business district in the daytime and the base station equipment operated in a residence district in the nighttime.

vii. A group of the base station equipment located strategically and collectively is referred to as a bank.

viii. In this way, the group of the base station equipment can share several components. Therefore, supplementary advantages can be obtained.

ix. The shared components are not limited and include a power supply, control system, peripheral equipment, cabinet, etc.

x. The bank of the base station equipment is a natural result of the architecture and may be a source of cost reduction of the equipment.

xi. The bank size and bank quantity in a city are determined through a computation procedure linking the network cost to the reduced cost.

Description will be made of an embodiment of the network system to which the present invention is applied.

[Embodiment of Network System]

Figure 9:
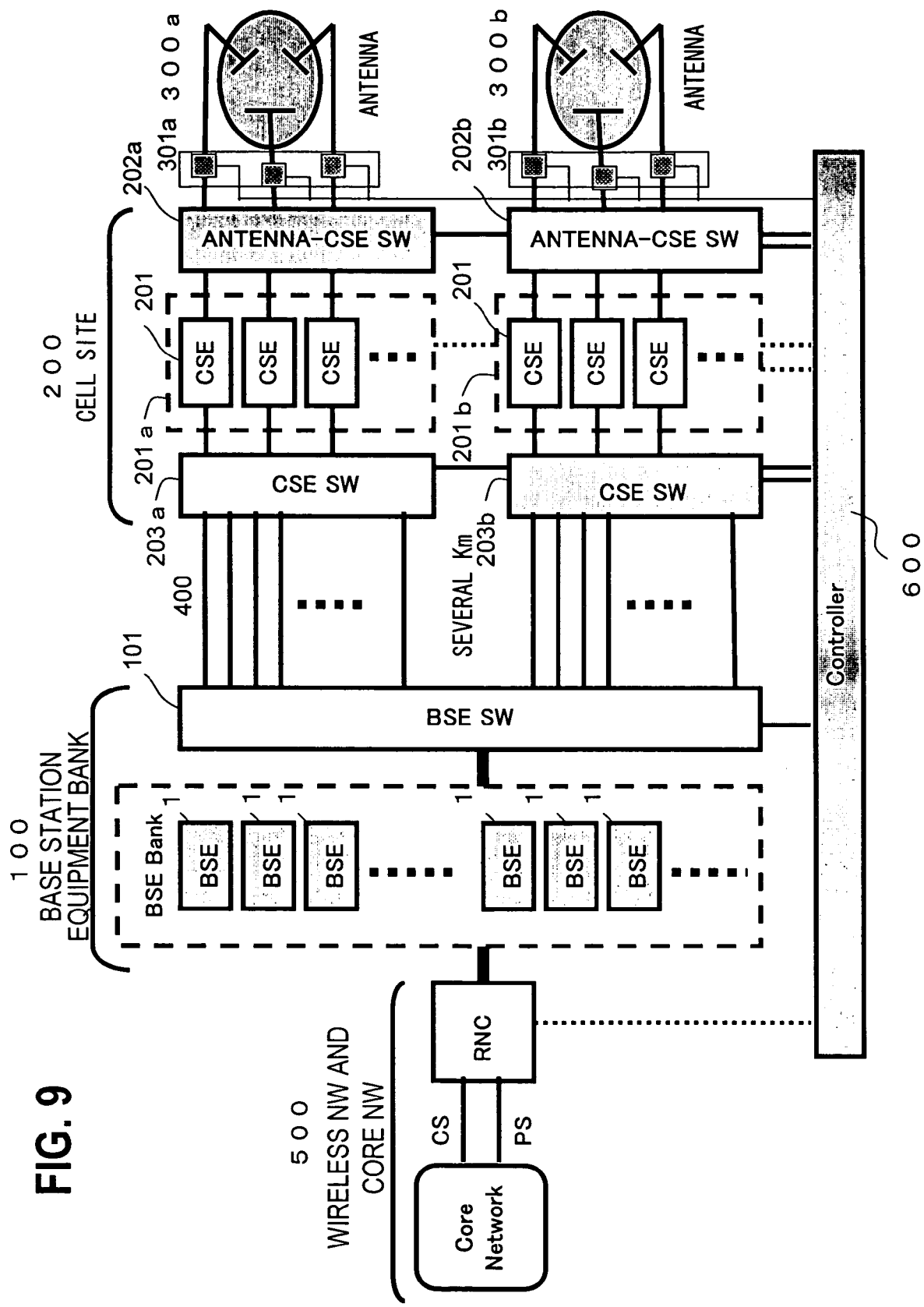
FIG. 9 shows an embodiment of a network system to which the present invention is applied.

FIG. 9 shows an embodiment of the network system to which the present invention is applied.

In the base station equipment bank 100, a plurality of the base station equipment 1 is collectively arranged. The base station equipment bank 100 has a base station equipment changeover switch 101.

A remote cell site 200 is provided with a reconfigurable antennas 300a, 300b correspondingly in each cell. Although two antennas 300a, 300b of either cell sites are illustrated in FIG. 9, this is not a limitation of the application of the present invention.

Each of node groups 201a, 201b corresponding to a plurality of the antennas 300a, 300b has a plurality of station equipment (CSE) 201. Each of the cell station equipment (CSE) 201 has an interface circuit corresponding to a transmission medium 400, a power amplifier, an impedance adjustment circuit, etc.

The cell site 200 has antenna-CSE switches 202a, 202b that switch and connect a plurality of the cell station equipment (CSE) 201 of the node groups 201a, 201b and each sector antenna of the antennas 300a, 300b.

The coaxial cables or optical fibers 400, i.e., the transmission media connect the base station equipment changeover switch 101 of the base station equipment bank 100 and the CSE switches 203a, 203b corresponding to the groups 201a, 201b of the cell station equipment (CSE) 201 at a distance of several hundred meters or several kilometers.

A plurality of the base station equipment 1 of the base station equipment bank 100 is connected to wireless network and core network 500 in common on the upstream side.

The base station equipment changeover switch 101, antenna-CSE switches 202a, 202b, and CSE switches 203a, 203b are controlled and switched by a controller 600.

Although the controller 600 is represented by one block in FIG. 9, the separation distance of several hundred meters to several kilometers actually exists between the base station equipment bank 100 and the cell site 200. Therefore, the controller 600 can be configured to be separated at the distance, or the controller 600 can be configured to be disposed on one side and the other side can be controlled through a signal line from the controller disposed on one side.

The target sector type as shown in FIG. 5 is determined by this controller 600 in accordance with the algorithm of the present invention, i.e., parameters such as QoS (quality of service) of the sectors of the target cell.

The base station equipment changeover switch 101, antenna-CSE switches 202a, 202b, and CSE switches 203a, 203b can be controlled and switched correspondingly to the determined sector type to reconfigure the cells adaptively.

Figure 9A:
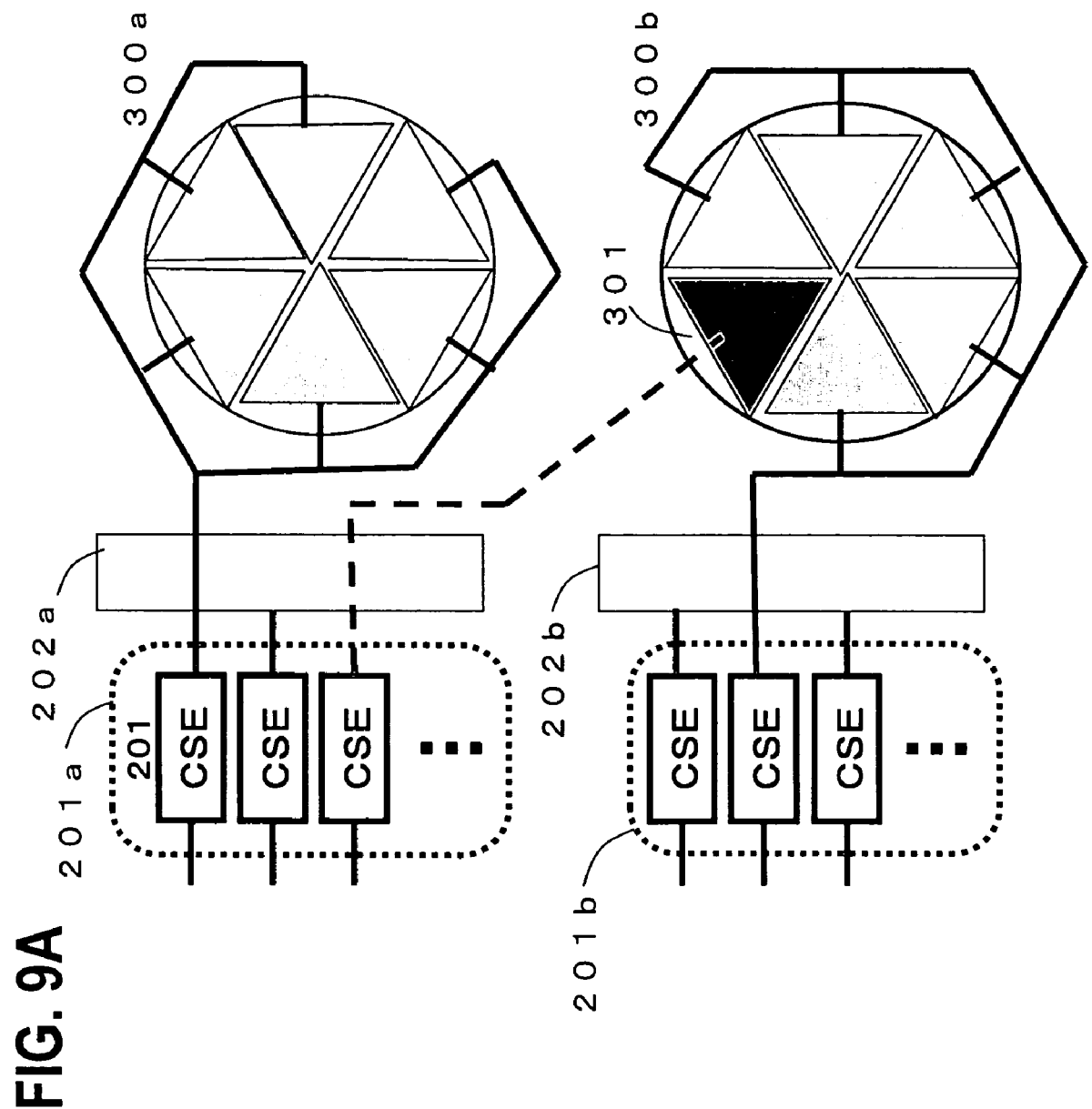
FIG. 9A shows conceptual operation of functions of antenna-CSE switches 202a, 202b.
Figure 9B:
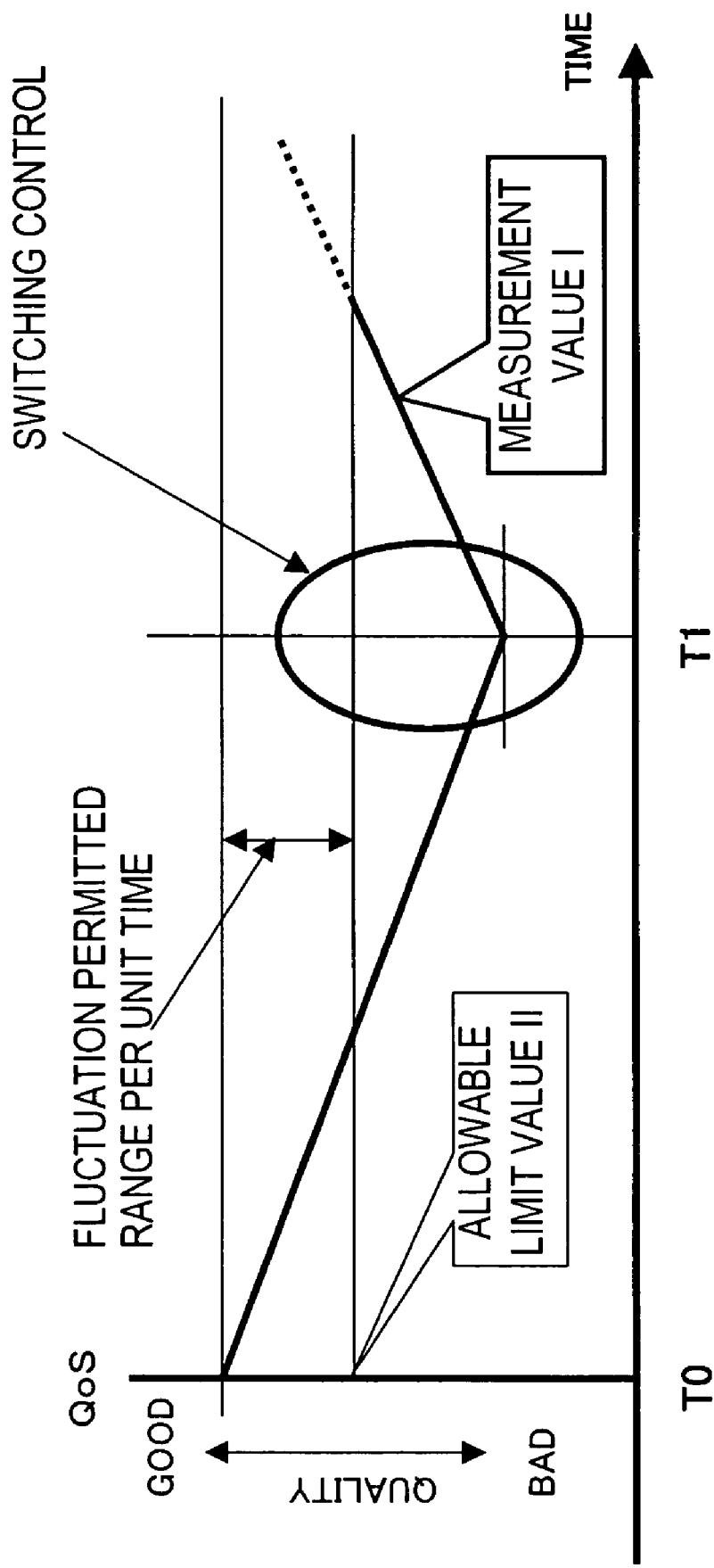
FIG. 9B is a diagram for describing switch changeover corresponding to FIG. 9A.

FIGS. 9A and 9B show a concept of the functions of the antenna-CSE switches 202a, 202b.

In FIG. 9A, all the sector antennas of the antenna 300a are connected to one of the cell station equipment (CSE) 201 in common by the switch 202a and the antenna 300a has omnidirectional radiation characteristic.

On the other hand, in the antenna 300b, the switching control is performed when the parameter of the sector antenna 301, for example, a QoS value, i.e., a parameter measurement value I becomes equal to or lower than an allowable limit value II over time, as shown in FIG. 9B. That is, the sector antenna 301 is independently detached from other sector antennas of antenna 300b and becomes independent from the CSE switch 203b corresponding to the node group 201b.

For example, the sector antenna 300 is connected to the cell station equipment (CSE) 201 of the node group 201a by the CSE switch 203a corresponding to the node group 201a. In this way, the QoS value is improved.

The requirements and features of each of the switches are summarized as follows.

[Antenna-CSE Switches 202a, 202b]

With this switch, the connection between the station equipment (CSE) 201 and the sector antennas of the antennas 300a, 300b is switched to connect the sector antennas to form an omnidirectional antenna or to detach one or more sector antennas from the omnidirectional antenna to obtain up to six sector antennas.

This switch has an impedance matching circuit that does not change the antenna impedance if the number of connected sector antennas is changed.

The connection configuration between the antennas 300a, 300b and the station equipment (CSE) 201 is determined by the controller 600. Therefore, the antenna-CSE switches 202a, 202b must be safely matched with the impedance matching circuit.

In the embodiment of six sectors, the switches 202a, 202b must be able to connect one input to one or more, up to six sector antennas in the embodiment. When the system has low traffic load, one input is connected to six outputs. Contrary, when the system has high traffic load, each input is connected to each output. Any combinations must be possible.

[Cable-CSE Switch 203a, 203b]

This switch is used for connecting the transmission medium 400 between the cell site 200 and the base station equipment bank 100.

If the coaxial cables or optical fibers are used for the transmission to the cell site 200, the switches 203a, 203b must process the coaxial cables or optical fibers dependently.

It is desirable that the switches 203a, 203b have low transmission loss. The switches 203a, 203b need the impedance matching apparatus.

The connection between any independent transmission medium and any base station equipment 1 is determined by the controller 600. Therefore, the switches 203a, 203b are fully accessible switches. The switches 203a, 203b must have a function for connecting one input to several outputs. In the embodiment of the present invention with six sectors, the switches 203a, 203b must enable more flexible control such that one input can be connected to one or more base station equipment 1 (up to six in the embodiment) to enable flexible switching control of more than one input.

[Optical or Coaxial Switch 101 of BSE Bank Site]

This switch 101 can link the centralized bank 100 of the base station equipment 1 to the cell site 200. If the coaxial cables or optical fibers 400 are used for the transmission to the cell site 200, the switch 101 must process the coaxial cables or optical fibers dependently. The switch 101 has low transmission loss.

In the case of transmission through the coaxial cables, the switch 101 needs only a simple impedance matching apparatus.

The connection between any independent transmission medium and any base station equipment 1 is determined by the controller 600. Therefore, the switch 101 is a fully accessible switches.

The parameter information such as QoS (quality of service) is the reference of the control for the controller 600 and is obtained by circuits 301a, 301b that detect a traffic state of each sector antenna of the antenna 300a, 300b.

As described above, the architecture according to the present invention needs a control mechanism that can perform sector detachment and sector coupling to change the configuration of the cell site 200.

Through this algorithm, the traffic capability of the cell site 200 is increased or decreased to permit optimum service to the stations of the cells in the area.

The configuration of the cell site 200 is controlled by the following algorithm.

[Cell Site Configuration Changing Algorithm]

The objective of the control system is to provide good quality of service to end users while using less physical resources.

In one example, a parameter called "quality of service (QoS)" is used as a parameter for understanding user quality of service. This parameter is a rate of the number of calls that cannot be set up (lost calling calls) to the total number of presented calling calls.

QoS=lost calls/presented calls

Other calling factors are used as control parameters to obtain optimized network operation and to provide good service to all subscribers.

These parameters are as follows.

Qh: threshold of QoS, upper value
Ql: threshold of QoS, lower value
To: traffic per cell
Tc: carried traffic per cell
Lc: number of lost calls
F1; first lost call
Pc: power of sector radiation (in the case of CDMA)

With regard to the QoS of 2% or 0.02%, the QoS of 2% is worse than 0.002. As the number becomes smaller, the QoS value becomes better.

Description will be made of a control algorithm for one cell site, which uses the QoS as the parameter for controlling the system.

The control algorithm is performed in each cell site independently from other cell sites. In the present invention, the six-sector site is one embodiment, and the present invention can be used with more or less number of sectors.

The antennas 300a, 300b of the cell site 200 is constituted by six sector antennas that can be controlled independently. Therefore, the omnidirectional antenna system can be formed, or six sector antennas can be detached independently from each other to form six sector antennas.

Up to nine sectors can be easily utilized by using readily available sector antennas. An antenna with narrower directivity patterns can be designed to use more sectors.

The parameter QoS is obtained based on the traffic state of each sector antenna, which is detected by the detection circuit 301a, 301b. The switch control is performed in accordance with the algorithm described with reference to flows shown in FIGS. 10, 11, and 12.

Figure 10:
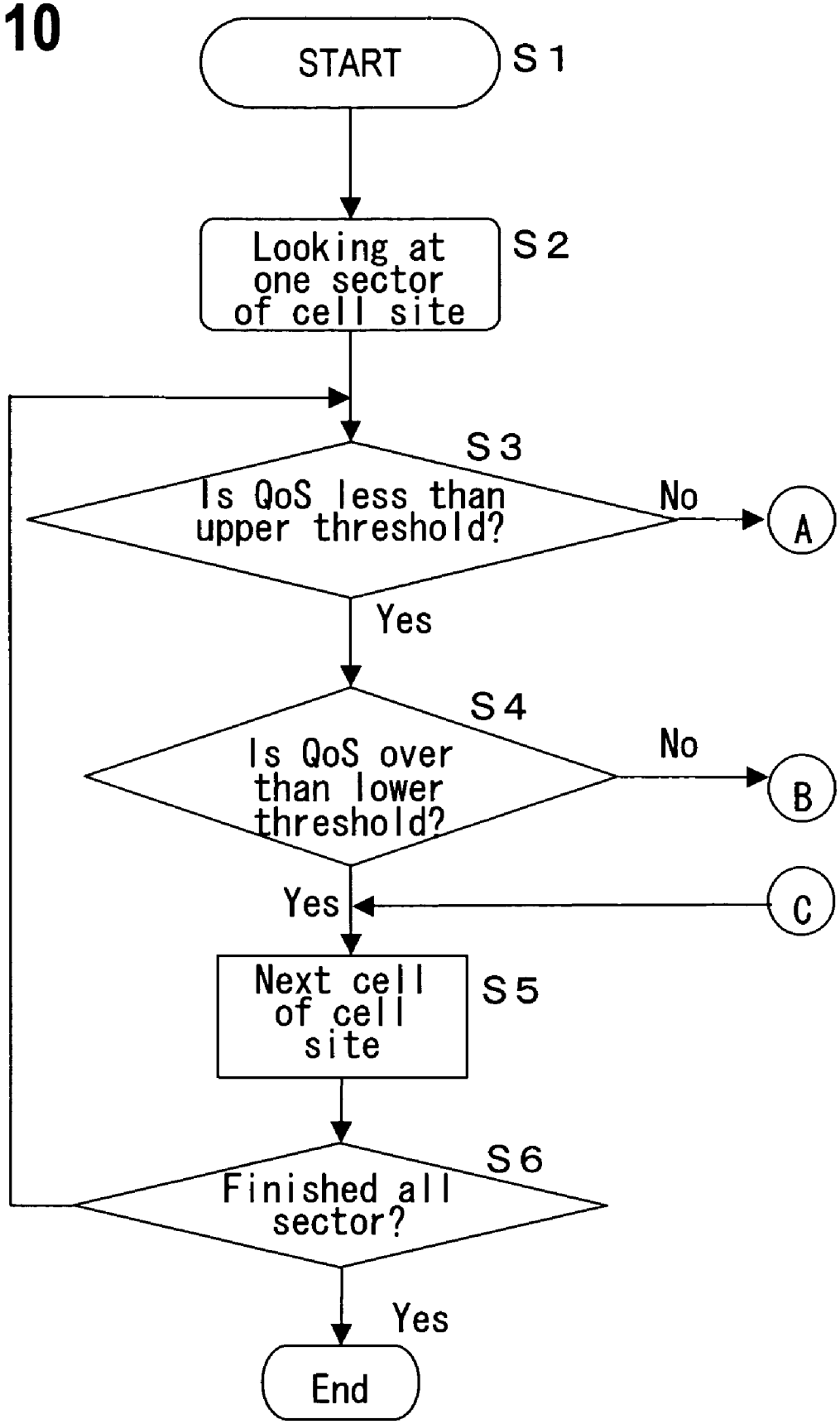
FIG. 10 is a flow (part 1) when the switch control is performed in accordance with the algorithm.

In FIG. 10, the algorithm is started by a trigger (step S1). A clock signal with a predetermined cycle can be used for the trigger.

The controller 600 looks at one sector of the cell site 200 (step S2) and compares the QoS (quality of service) value with the upper threshold Qh. If the numerical value of QoS is the upper threshold Qh or more, the procedure goes to a process A for correction measures (step S3, No).

If the QoS is less than the upper threshold Qh, the next check is performed. That is, the controller 600 checks whether the QoS is greater than the lower threshold Ql in the cell (step S4). If the QoS is less than the threshold, the procedure goes to a process B for correction measures (step S4, No).

If the QoS is greater than the lower threshold (step S4, Yes), the same process and determination are performed for the next sector (step 5)

After the process is performed to the last sector, the process is terminated to wait for the next trigger (step S6, Yes).

Description will be made of the process A shown in FIG. 11.

The process A is a process performed when the QoS (quality of service) value is at the upper threshold Qh or more (step S3, No).

Figure 11:
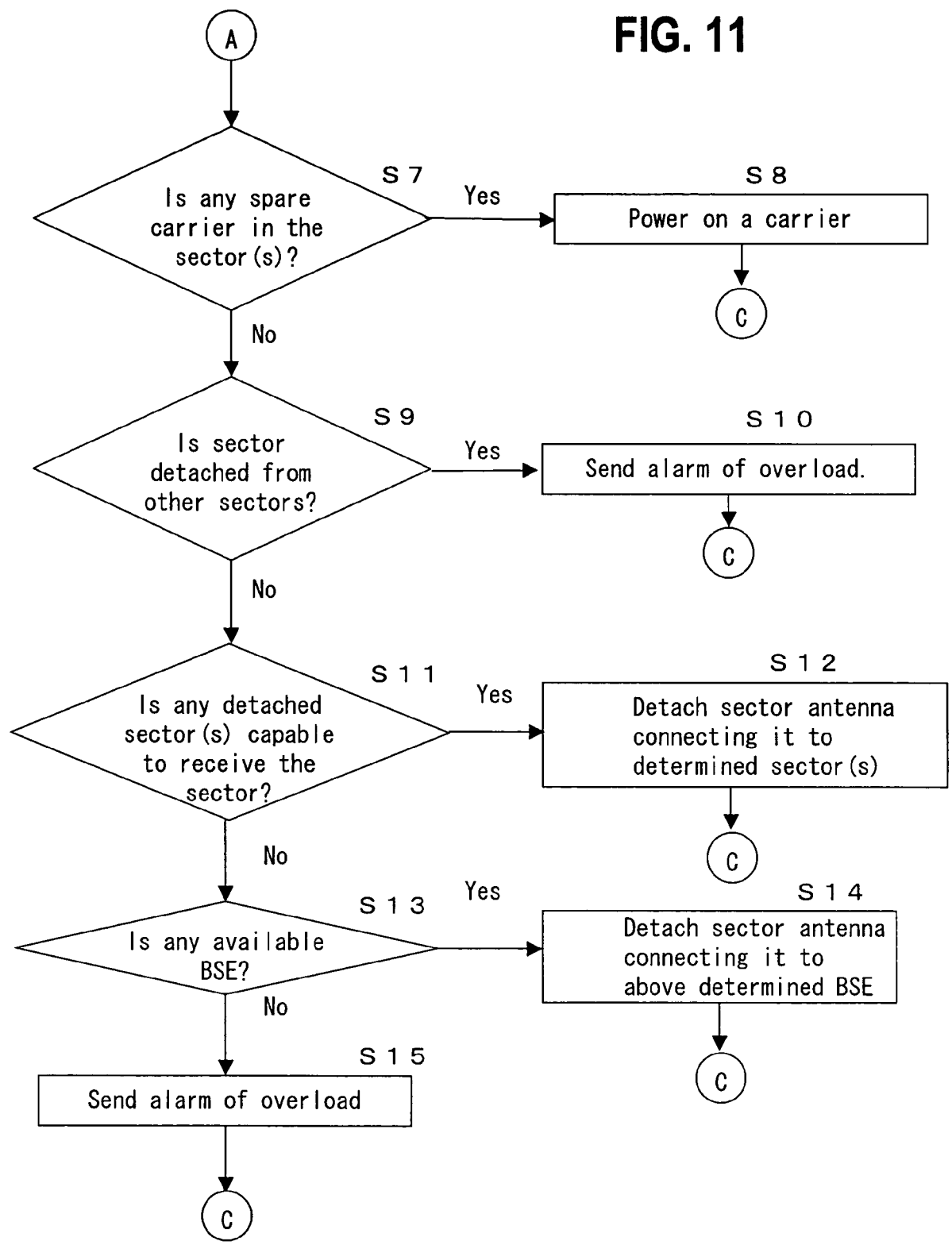
FIG. 11 is a flow (part 2) when the switch control is performed in accordance with the algorithm.

In FIG. 11, it is determined whether or not another non-operating carrier exists in the sector (step S7). Although the base station equipment can supply (operate) a plurality of carriers with the transmission power, the transmission power may not be supplied to the other carriers for other reasons (e.g., a license cannot be obtained).

If another non-operating carrier exists which is not supplied with the transmission power (step S7), the transmission power is supplied to the carrier, and the process continues in other sectors (step S8), and the process continues in the next sector of the cell site (step S5 of FIG. 10)

That is, after the transmission power is supplied to the carrier, the system adds the carrier automatically supplied with the transmission power to the operating carriers in the sector to obtain better quality of service. This means that an operable carrier exists in at least one sector, and one of non-operating carrier is shifted to service operation and is supplied with the transmission power.

In step S7, if another non-operating carrier does not exist (step S7, No), it is detected whether the sector is detached from other sectors (step S9). If the sector is detached and is supplied with the transmission power (step S9, Yes), other remedial measures are not performed.

That is, the process of step 9 is relevant to the antenna reconfiguration, and the determination of the detachment of the sector from other sectors means that it is checked whether the sector is operated independently or is connected and operated jointly with other sectors. If the sector is operated jointly with other sectors, the sector can be detached to support larger traffic capacity.

Therefore, if the sector is operated independently (step S9, Yes), since larger traffic capacity cannot be obtained, an overload alarm is sent to the management system including the controller 600 and the procedure continues to step S5 of FIG. 10 (step S10).

If the sector is not detached, that is, if the sector is connected and operated jointly with other sectors (step S9, No), it is checked whether or not any detached sector in the cell site has a capacity capable of receiving a new sector and subscriber thereof (step S11).

If a detached sector has the available capacity (step S11, Yes), the sector antenna is detached from the original base station equipment and is added by the switches 202a, 202b in the cell site 200 to the determined detached sector.

If a sector having a spare capacity does not exist (step S11, No), it is checked whether an available base station equipment exists or not (step S13). If one base station equipment is available, the base station equipment is connected to the detached sector by the transmission medium to the cell site 200 and the cell site switches 203a, 203b (step S14).

If an available base station equipment does not exist (step S13, No), the overload alarm is transmitted (step S15).

After the process of steps S8, S10, S12, S14, and S15, the process is continued to the next sector (step S5, FIG. 10).

Figure 12:
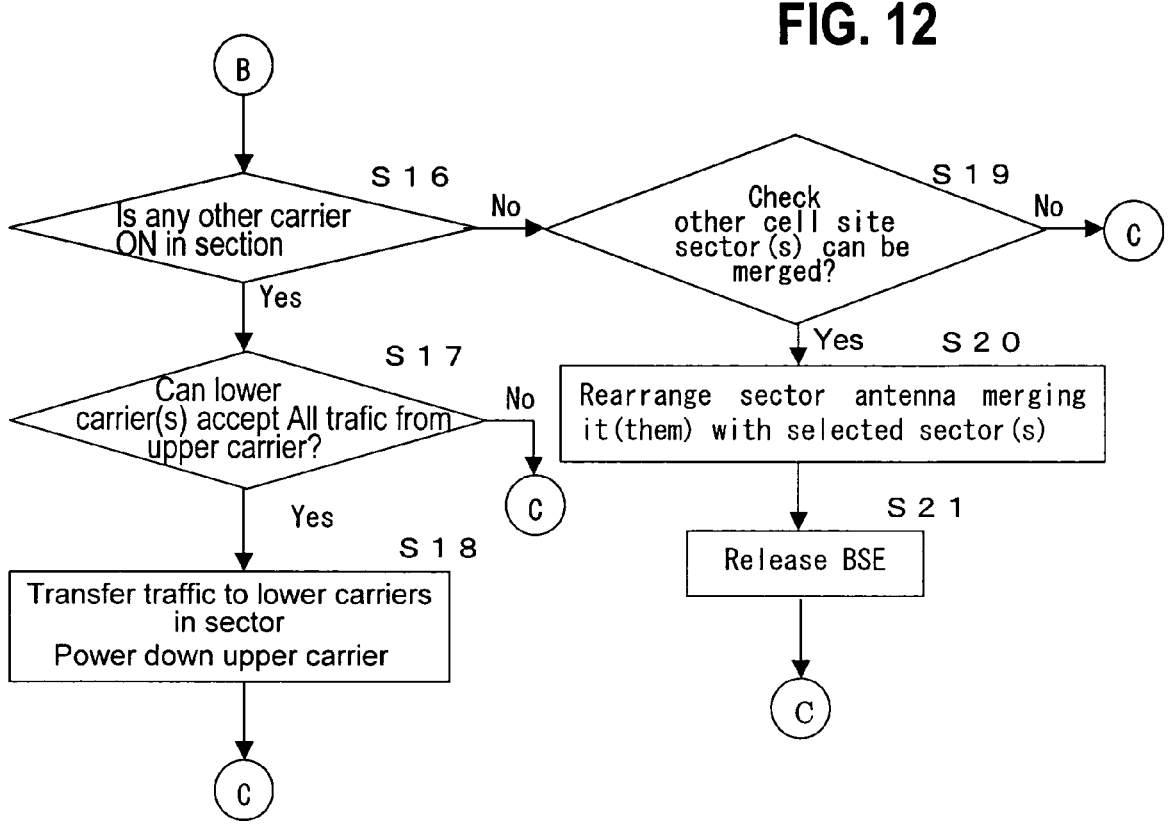
FIG. 12 is a flow (part 3) when the switch control is performed in accordance with the algorithm.

Description will be made of the process B shown in FIG. 12.

The process B is a process performed when the QoS is at the lower threshold Ql or less (step S4, No).

It is checked whether any other carrier is operated in the sector or not (step S16). If other carriers are operated (step S16, Yes), it is determined that lower frequency carriers can receive all traffic from an upper frequency carrier (step S17).

Since the system has an excess capacity, the supply of the transmission power to the carrier can be stopped. If one or more carrier are activated, the traffic is shifted to other carriers (in this case, lower frequency carriers are selected). The transmission of the upper frequency carrier can be stopped. However, if a single carrier is activated, the sector is merged with another sector to reduce the capacity as an alternative. Therefore, a process after step S19 is needed.

If lower frequency carriers can receive all traffic from an upper frequency carrier (step S17, Yes), the traffic is transferred to lower frequency carriers; the transmission power of the upper frequency carrier is discontinued; and the process is shifted to the next sector (step S18). That is, since lower frequency carriers can receive the traffic in the upper frequency carrier, the traffic is shifted to lower frequency carriers. After shifted to lower frequency carriers, the upper frequency carrier is stopped.

In the sector, if any other carrier is not operated (step S16, No), it is checked whether the sector can be merged with another sector (step S19). If the sector cannot be merged, the process is shifted to the next sector (step S19, No).

If the sector can be merged (step S19, Yes), the sector antenna connection is reconfigured through the cell site switches 202a, 202b (step S20). One of the base station equipment is released and returned to the base station equipment bank 100 (step S21).

The algorithm described above can arrange each sector in a cell site independently. Therefore, the flexibility is very high. At a certain moment, only one sector can be independent and other five sectors can be connected in common in the six-sector cell site. Alternatively, two/three or more sectors are connected in a continuous or discontinuous manner.

Figure 13:
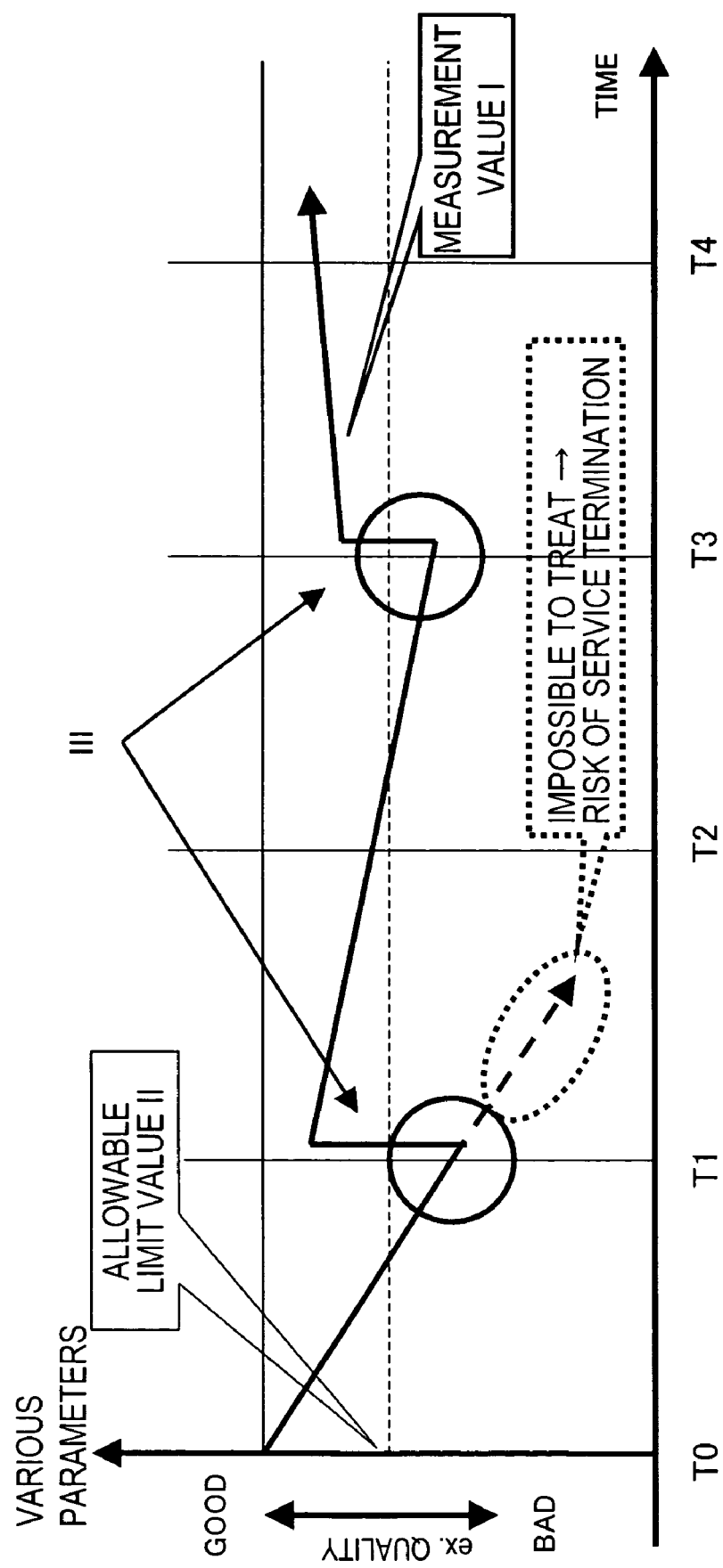
FIG. 13 is a diagram for describing the effect of the improvement process according to the present invention, which is obtained by the cell reconfiguration executed in accordance with the algorithm.

FIG. 13 is a diagram for describing the effect of the improvement process according to the present invention, which is obtained by the cell reconfiguration executed in accordance with the algorithm.

FIG. 13 shows the over-time changes in the measurement value of the parameter such as the quality of service (Qos) described in one example.

In this regard, the present invention can improve the parameter value by reconfiguring the combinations of the sector antennas and the base station equipment correspondingly to the measured parameter (FIG. 13, III). In this way, better transmission quality can be maintained with less equipment in the system where the equipment such as base station equipment are disposed in consideration of the worst state of the parameter value.

Description will further be made of economic effects obtained with the present invention described above with reference to FIG. 14. The present invention realizes an optimum cell-sector configuration to adapt to the traffic fluctuation and can achieve considerable reduction of the amount of equipment such as the base stations as a result.

Figure 14:
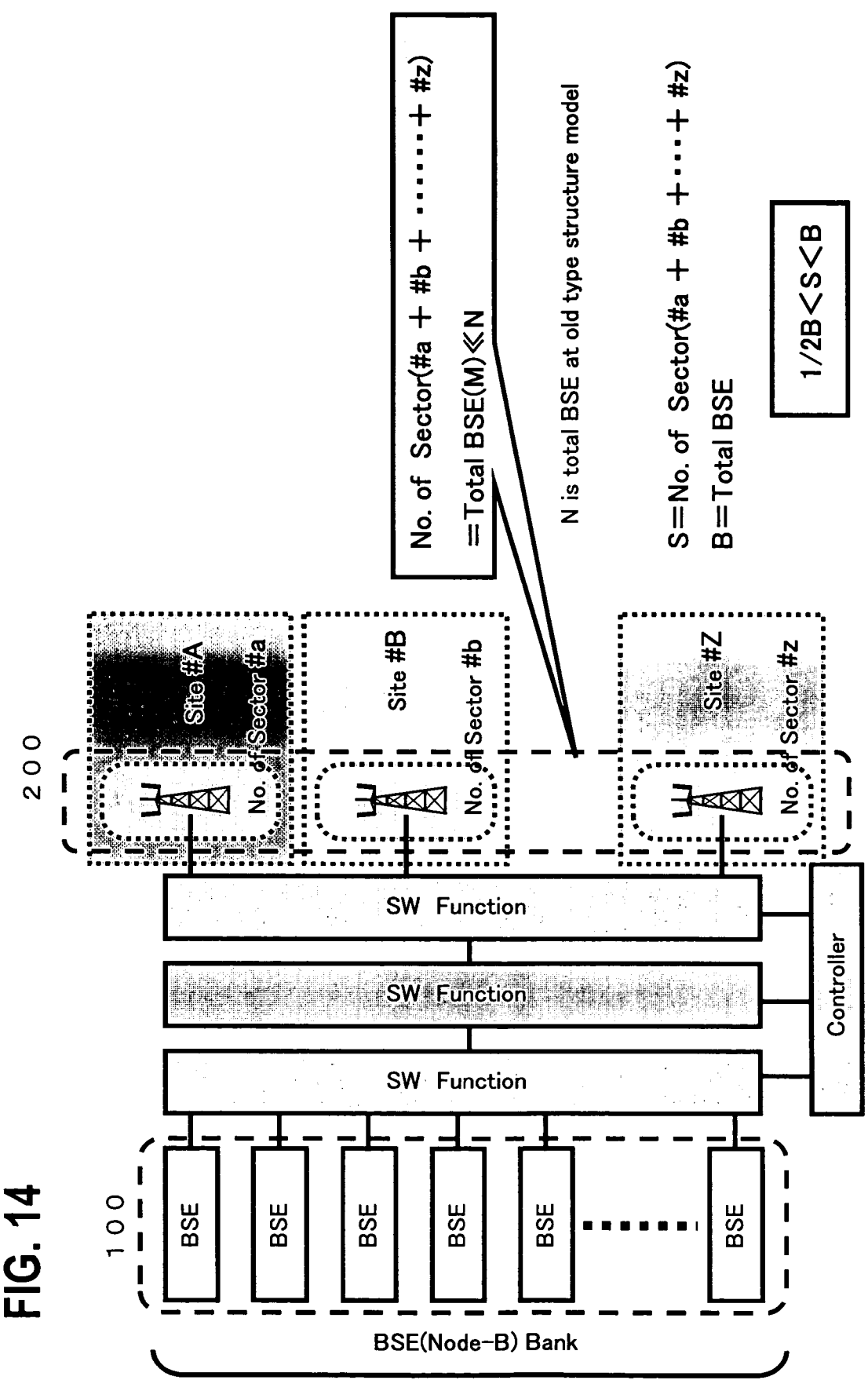
FIG. 14 is a diagram for describing the economic effects obtained by the application of the present invention.

In FIG. 14 describing the economic effects obtained with the present invention, N is assumed to be the number of the base station equipment (BSE) disposed in the base station equipment bank 100 in a configuration model of a conventional mode.

It is assumed that a plurality of sits #A to #Z exists in the cell site 200 and the number of sectors in each site is assumed to be #a to #z. Therefore, the total number of sectors is S in the cell site 200 (=#a+#b+ . . . #z) is equal to a reduced number of base station equipment in an ideal model, which is much smaller than the number N of base station equipment (BSE) in the conventional mode.

Although the equipment of the wireless network system such as base station equipment are dependent on various conditions such as installation locations, in an ideal model case, the number of the installed base station equipment can be reduced to near ½ by applying the present invention as shown in the following relational expression.

½B<S<B

B is the total number of the base station equipment.

According to the invention, a cell configuration can be easily and dynamically changed with less equipment correspondingly to a communication environment. Therefore, an economical cellular network system can be provided, which greatly contributes to the industry.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A dynamic cell configuring method in a cellular network system including an antenna that has a plurality of sector antennas disposed correspondingly to a cell, and a plurality of base station equipment disposed at a location distant from the antenna through a transmission medium, the transmission medium being a plurality of coaxial cables or optical fibers linking the plurality of the base station equipment and a plurality of cell station equipment, the dynamic cell configuring method, comprising:

switching connection between the plurality of the base station equipment and the plurality of the sector antennas based on signals received by the plurality of the sector antennas;

transmitting different signals respectively by a first sector antenna and a second sector antenna when the first sector antenna and the second sector antenna are connected with different base station equipment, while transmitting same signals by the first sector antenna and the second sector antenna when the first sector antenna and the second sector antenna are connected with same base station equipment, according to the switching of connection between the plurality of the base station equipment and the plurality of the sector antennas;

switching connection of the combination of the plurality of the coaxial cables or optical fibers and the plurality of the cell station equipment on the antenna side based on a detected parameter to reconfigure the combination of the connection between the plurality of the base station equipment and the plurality of the cell station equipment, and the plurality of sector antennas; and switching connection of the combination of the plurality of the coaxial cables or optical fibers and the plurality of the base station equipment on the base station equipment side, and the sector antennas at the antenna site based on the detected parameter to reconfigure the combination of the connection between the plurality of the base station equipment and the plurality of the cell station equipment, and the plurality of sector antennas.

2. The dynamic cell reconfiguring method according to claim 1, wherein the signals received by the plurality of the sector antennas indicate a quality of service (QoS) value.

3. The dynamic cell reconfiguring method according to claim 1, wherein the antenna has a plurality of sector antennas, and wherein when the plurality of sector antennas are connected to a same cell station equipment in common, the plurality of sector antennas have omnidirectional antenna radiation characteristics.

4. A cellular network system including an antenna that has a plurality of sector antennas disposed correspondingly to a cell, and a plurality of base station equipment disposed at a location distant from the antenna through a transmission medium, the cellular network system, comprising:

a plurality of cell station equipment that has interfaces and amplifiers corresponding to the transmission medium on the antenna side;

a first switch that switches and connects the plurality of the cell station equipment to the plurality of the sector antennas of the antenna;

a controller that controls the first switch so as to switch connection between the plurality of the base station equipment and, the plurality of the sector antennas according to signals output from the plurality of the sector antennas; and wherein a first sector antenna and a second sector antenna respectively transmit different signals when the first sector antenna and the second sector antenna connected with different cell station equipment, while the first sector antenna and the second sector antenna transmit same signals when the first sector antenna and the second sector antenna are connected with same base station equipment, according to the switching of connection between the plurality of the base station equipment and the plurality of the sector antennas; and wherein the transmission medium is a plurality of coaxial cables or optical fibers linking the plurality of the base station equipment and the plurality of the cell station equipment, the cellular network system further comprising:

a second switch that switches and connects the combination of the plurality of the coaxial cables or optical fibers and the plurality of the cell station equipment on the antenna side; and a third switch that switches and connects the combination of the plurality of the coaxial cables or optical fibers and the plurality of the base station equipment on the base station equipment side, and the sector antennas at the antenna site, wherein the control circuit further controls the second and third switches based on a detected parameter to reconfigure the combination of the connection between the plurality of the base station equipment and the plurality of the cell station equipment, and the plurality of sector antennas.

5. The cellular network system according to claim 4, wherein the signals output from the plurality of the sector antennas indicate a quality of service (QoS) value.

6. The cellular network system of claim 4, wherein the cell station equipment includes a circuit that adjusts impedance changed depending on which of the plurality of sector antennas is connected.

7. The cellular network system of claim 4, wherein the antenna includes a plurality of sector antennas, and wherein when the plurality of sector antennas are connected to the same cell station equipment in common, the plurality of sector antennas have omnidirectional antenna radiation characteristics.

* * * * *